Aug. 11, 1964   E. G. GRÖNKVIST   3,144,176
APPARATUS FOR REMOTE CONTROL OF A NUMBER OF OPERATIONS
Filed March 7, 1961   3 Sheets-Sheet 2

INVENTOR.
Ernst Gunnar Grönkvist
BY Jarvis C. Marble
his attorney

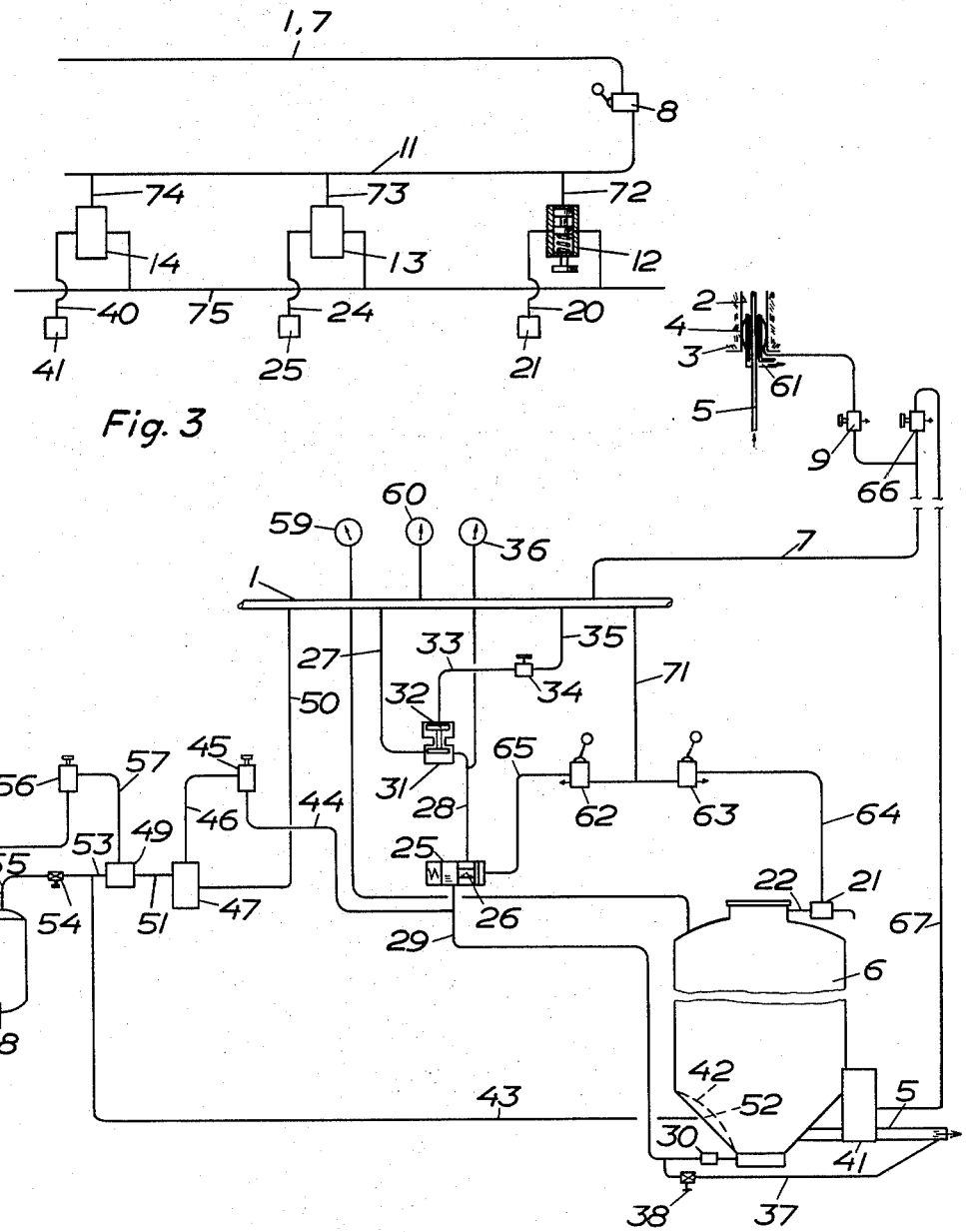

United States Patent Office 3,144,176
Patented Aug. 11, 1964

1

3,144,176
APPARATUS FOR REMOTE CONTROL OF A
NUMBER OF OPERATIONS
Ernst Gunnar Grönkvist, Stockholm, Sweden, assignor to Atlas Copco Aktiebolag, Nacka, Sweden, a corporation of Sweden
Filed Mar. 7, 1961, Ser. No. 93,955
Claims priority, application Sweden Mar. 8, 1960
10 Claims. (Cl. 222—195)

This invention relates to apparatus for remote control of a number of operations over a pressure fluid conduit and to devices which may be associated therewith. One object of the invention is to provide an apparatus for remote control of various operations in connection with material transport, for instance in connection with the transport of explosives to one or more drill holes for the purpose of charging said holes. The pressure fluid in an apparatus according to the invention may be pressure liquid, pressure gas or compressed air or vacuum, but the invention is described in the following specification in connection with a compressed air operated apparatus which, however, should not be considered as limiting the scope of the invention as set forth in the appended claims. The invention may be employed for carrying out a number of different operations which operations may be carried out by action of the pressure fluid in the pressure fluid conduit or by a different and separate pressure fluid controlled by said control means.

Figure 1A:
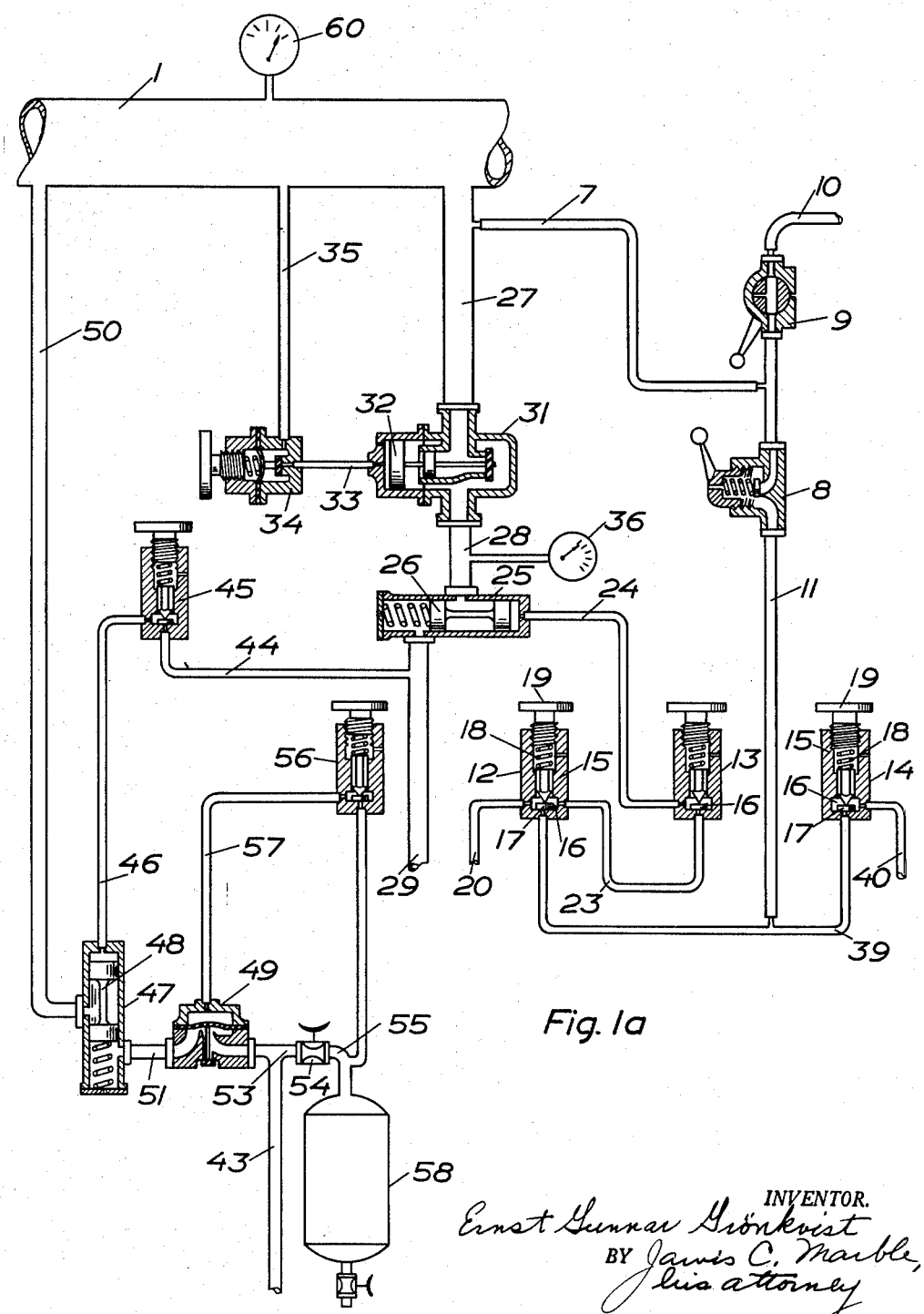
Figure 1B:
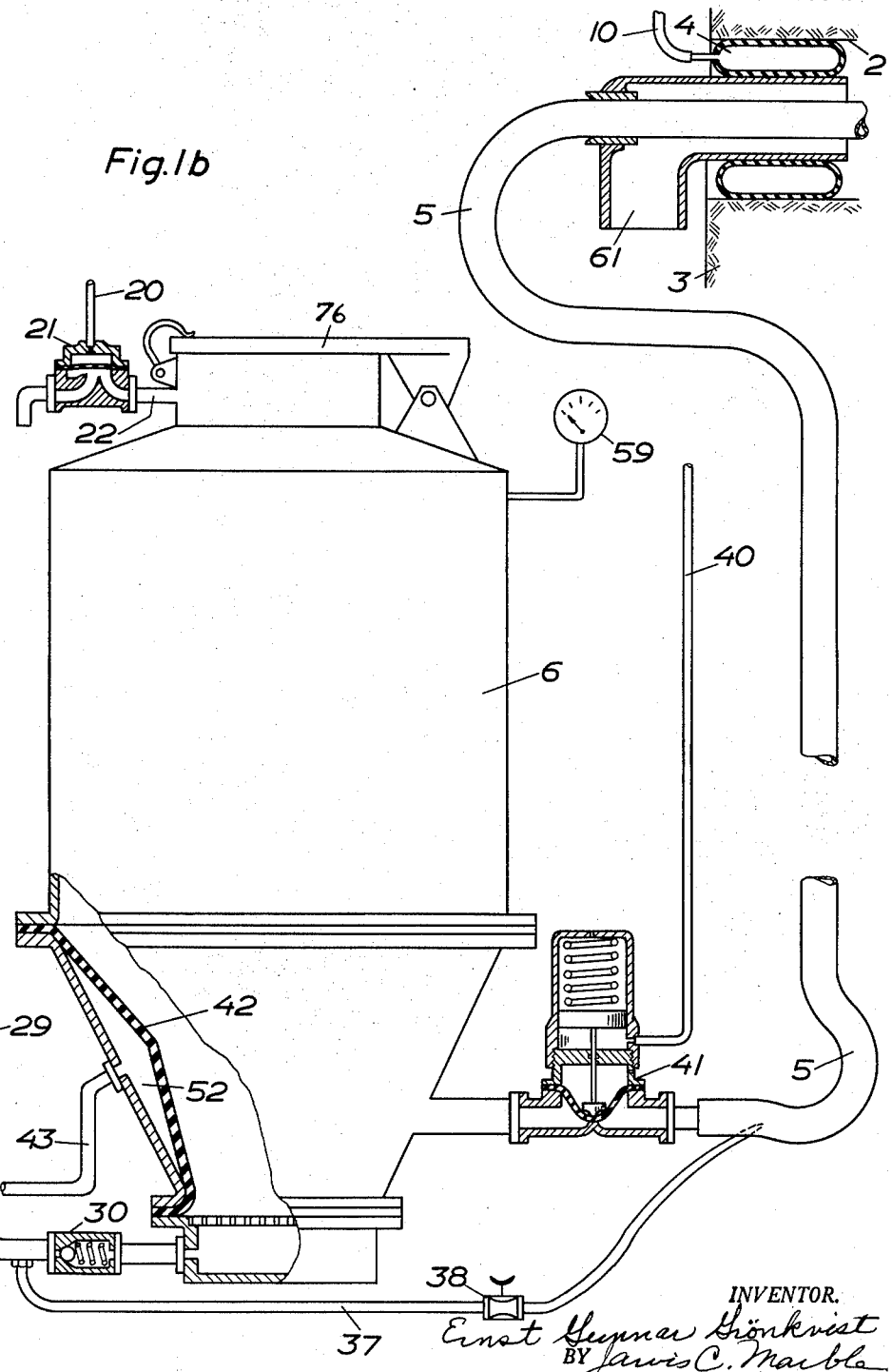

In the accompanying drawings an apparatus for remote control of a material transport device is illustrated by way of example, as well as an apparatus for more direct control of such a material transport device and a diagrammatic modification. FIG. 1a and 1b is a diagrammatic view of an apparatus for remote control according to the invention, and FIG. 2 is a diagrammatic view of a hand operated apparatus according to the invention. FIG. 3 illustrates diagrammatically a modification of FIG. 1.

In the various figures equivalent elements have been designated with the same reference numerals and such equivalent elements are therefore only described in detail in connection with FIG. 1. In FIG. 1 which has been divided in FIG. 1a and FIG. 1b reference 1 indicates a main compressed air supply conduit leading from a suitable compressed air source. 2 is a hole drilled in the rock 3 and 4 is an inflatable rubber ring adapted to be inserted in the mouth of the drill hole through which ring is inserted a plastic tube 5 leading from a container 6 for an explosive, for instance a mixture of ammonium nitrate and oil. The plastic tube 5 may end close to the bottom of the drill hole 2. A pressure fluid conduit 7 conducts compressed air from the main conduit 1 to a pressure reduction valve 8 arranged for step by step pressure reduction and, furthermore, to a 2-way valve 9 from which a hose 10 leads compressed air to the sealing ring 4 for inflating said sealing ring or for venting it, respectively. The valve 9 therefore has two positions and in one position as illustrated on the drawing compressed air is admitted through the valve 9 to the sealing ring 4 whereas in another position of the valve 9 the sealing ring is vented to the atmosphere. From the main pressure reduction valve 8 a pressure fluid conduit such as a hose 11 leads to a number of control means 12, 13, 14 which in the illustrated embodiment may simply comprise pressure fluid operated regulating valves adjustable for various opening pressures and of conventional design. Said valve may comprise a housing 15 forming a cylinder chamber 16 in which a valve member 17 is movable against the action of a spring load 18 which may be adjusted by means of a set screw 19 as indicated in connection with the valves 12 and 14. The valve 13 is carried out in the same way.

2

The conduit 11 communicates with the bottom of the cylinder chamber 16 in the valves 12 and 14. The valve 12, may for instance be set to open at 2.5 kg./cm.² above atmospheric pressure. When the valve 12 opens, compressed air from the conduit 11 flows through the valve 12 to a conduit 11 flows through the valve 12 to a conduit 20 leading to an operating means such as a membrane operated valve 21 which through a pipe 22 communicates with the interior of the container 6. The valve 21 is normally in open position so that the container 6 is normally vented to the atmosphere when the container is being filled but the valve 21 is closed as soon as for instance 2.5 kg./cm.² above atmospheric is supplied to the conduit 20.

The valve 12 has also connected thereto a conduit 23 which, when the valve member 17 is lifted from its seat, admits pressure fluid to the chamber 16 of the valve 13. When the main control valve 8 is set for the next higher pressure, for instance 3.5 kg./cm.² above atmospheric, for which pressure the valve 13 may have been set, then the valve 13 opens and compressed air is admitted through a conduit 24 to a main admission valve 25 provided with a spring actuated piston valve member 26 which against spring action opens a communication from the compressed air conduit 1 over conduits 27, 28, 29 and a check valve 30 to the interior of the container 6. The conduit 27, 28 contains a pressure reduction valve device 31 which is provided with a piston valve member 32 which on one side is actuated by the pressure in the conduit 28 and at the opposite side by the pressure in a conduit 33 which over a pressure reduction valve 34 and a conduit 35 is connected with the pressure fluid conduit 1. The pressure reduction valve 34 is of the conventional type in which pressure reduction is obtained by adjustment of the spring pressure on the valve member. A gauge 36 indicates the pressure in the conduit 28 and consequently the admission pressure of the compressed air supplied to the container 6. The pressure reduction valve 34 maintains a certain constant pressure on the left hand side of the piston valve 32 and the piston valve 32 keeps the pressure constant in the conduit 28 irrespective of the quantity of air which passes through the conduit 28 and consequently irrespective of the position of the piston valve 32 in the valve casing 31. From the conduit 29 a small conduit 37 leads over a throttle valve 38 to the plastic pipe 5 from the container 6 through which small conduit 37 initiating air may be supplied to the plastic pipe 5 as soon as the main valve 25, 26 opens. An adjustable valve 14 is connected to the conduit 11 over a conduit 39 and when the control valve 8 has been moved, for instance to the position for 5.5 kg./cm.² above atmospheric pressure, then the valve 14 which is set for said pressure opens and admits compressed air through a conduit 40 to a compressed air operated delivery valve 41 in the pipe line 5 so that the valve 41 opens and transportation of material through the pipe line 5 by means of compressed air admitted through conduit 29 starts. As the drill hole 2 is successively filled the plastic pipe 5 is slowly moved out of the sealing ring 4.

At the bottom of the material container 6 a pulsation device is provided for the purpose of keeping the material in the bottom portion of the container in motion. Said pulsation device comprises an annular rubber diaphragm 42 extending along the inside of the frustoconical bottom portion of the container 6. Between said diaphragm and the wall of the container air pulsation is caused to take place in a chamber 52 connected to a conduit 43. 76 indicates the filling cap of the container 6 which in closed position provides an air tight closure of the container. The pulsations in the conduit 43 are produced as soon as compressed air branched off from the conduit 29 to a regulating valve 45 of the same type as the valves 12, 13, 14 opens. Said valve 45 is set, for instance, to open at a pressure which is 1 kg./cm.² lower than the operating pressure in the conduit 29. When the valve 45 is opened, compressed air through a conduit 46 is admitted to one end of a piston valve member 48 of a valve 47 so that said piston valve member against spring pressure opens the supply of compressed air to a diaphragm operated shut-off valve 49 over conduits 50 and 51 leading from the main compressed air supply conduit 1. The membrane operated valve 49 under the influence of compressed air in the conduit 51 admits compressed air through the conduit 43 to the pulsation chamber 52. A conduit 53 leads from the conduit 43 over an adjustable throttle valve 54 and a conduit 55 to a regulating valve 56 of the same type as the valves 12, 13, 14 which may, for instance, be set to open at 5.5 kg./cm.² above atmospheric. When the pressure in the conduit 55 gradually increases and reaches said value, the valve 56 opens and compressed air flows through a conduit 57 to the diaphragm operated valve 49 which is consequently closed and interrupts the communication between the conduit 51 and the conduit 43 and instead opens a vent passage from the conduit 43 to the atmosphere. The pressure in the container 6 then moves the diaphragm 42 towards the wall of the container. An equalizing vessel 58 communicates with the conduit 55 and the pressure in said vessel now falls slowly since air escapes through the throttle valve 54 and the vent passage in the diaphragm operated valve 49. When the pressure in the vessel 58 has fallen below the operating pressure of the valve 56 said valve closes the air supply to the conduit 57 so that the pressure in the conduit 51 will again open the diaphragm valve 49 causing the pressure to rise in the conduit 43 and the pulsation chamber 52. The above described operations are then repeated with a pulsation frequency which depends on the adjustment of the throttle valve 54 and the volume of the vessel 58.

59 is a gauge which indicates the pressure in the container 6 and 60 is a gauge which indicates the pressure in the conduit 1. 61 is a vent pipe for the drill hole 2 through the sealing ring 4 enclosing the plastic pipe 5 and permitting the escape of air from the drill hole as said hole is successively filled with material from the container 6.

In the hand operated embodiment according to the invention illustrated in FIG. 2 a compressed air conduit 1 leads from the compressed air supply conduit to two hand operated valves 62 and 63. In open position the valve 63 admits operating air through a conduit 64 to the diaphragm operated valve 21 so that venting of the container 6 through said valve is interrupted. In closed position the valve 63 vents the conduit 64 so that the diaphragm operated valve 21 is free to open under the influence of the pressure in the container 6 and to vent said container to the atmosphere. The valve 62 in open position admits operating air through a conduit 65 to the main admission valve 25, 26, the piston valve member 26 of which then opens and admits compressed air to the container 6. In closed position of the valve 62 said valve vents the conduit 65 to the atmosphere so that the piston valve member 26 under the influence of its pertaining spring closes the compressed air admission to the container 6. A two-way valve 66 is connected to the conduit 7 and admits operating air to the main discharge valve 41 of the container through a conduit 67 so that said main discharge valve is opened. When the valve 66 is thrown to its other position, the conduit 67 is vented.

In the modification of FIG. 3 compressed air from the conduit 1, 7 is admitted by the main control step by step reduction valve 8 to the fluid pressure conduit 11 to which control means such as valves 12, 13, 14 are connected in parallel by conduits 72, 73, 74. From a source of pressure fluid separate and different from 1, 7 a second pressure fluid, for instance pressure water, is supplied through a conduit 75 to the various valves 12–14. According to the setting of the opening pressures of said valves they are opened one after the other as the valve 8 is moved to its various pressure positions so that pressure fluid is admitted in the desired sequence from the conduit 75 to the conduits 20, 24 and 40 to the operating means 21, 25 and 41, respectively.

The embodiments of the invention above described and illustrated in the drawings should only be considered as examples and may be modified in various ways within the scope of the claims. The stepwise adjustment of the pressure in a pressure fluid system may naturally be used to operate various other means than the different valves indicated in the above embodiments and, for instance, such stepwise control may be used for producing a number of different operations on connection with rock drilling on drill rigs or other devices in which remote control of various operations may be desirable and in which the invention may provide a possibility to reduce the otherwise necessarily large number of operating conduits.

What I claim is:

1. A fluid pressure remote control apparatus for controlling and operating a plurality of operating means actuated by fluid pressure and each of which is adapted to provide a separate operating function selectively concurrently or sequentially as controlled by said fluid pressure arrangement, which comprises in combination a plurality of operating means actuated by fluid pressure for providing said separate operating functions, a source of fluid pressure for actuating said operating means, conduit means for individually connecting said operating means to said source of fluid pressure, a plurality of fluid pressure control means connected into said individual conduit means between said operating means and said source of fluid pressure for selectively controlling flow of fluid pressure from said source thereof individually to said operating means, said fluid pressure control means also being actuated by fluid pressure, means for supplying fluid pressure individually to each of said fluid pressure control means, and a single manual control means for controlling said supply of fluid pressure seslectively to each of said fluid pressure control means for actuation thereof to control actuation of each of said operating means by fluid pressure from said source thereof.

2. Apparatus as recited in claim 1 in which said fluid pressure control means are actuated by different fluid pressures and in which said manual control means is a single pressure reduction valve operable for supplying different fluid pressures from said source thereof selectively to said plurality of fluid pressure control means for the individual actuation thereof depending upon the amount of fluid pressure supplied thereto.

3. Apparatus as recited in claim 1 in which said fluid pressure control means are connected in parallel to said source of fluid pressure therefor to be individually actuated directly by fluid pressure from said source of supply.

4. Apparatus as recited in claim 1 in which at least one of said plurality of fluid pressure control means is connected to said source of fluid pressure therefor in series with another of said plurality of fluid pressure control means for selective actuation of said one fluid control means only upon actuation of said other fluid pressure control means.

5. Apparatus as recited in claim 1 in which both said plurality of fluid pressure control means and said plurality of operating means are actuated by fluid pressure from a single source thereof.

6. Apparatus as recited in claim 1 in which said source of fluid pressure for actuating said plurality of operating means is different from said source of fluid pressure for actuating said plurality of fluid pressure control means.

7. In apparatus of the character described for the transportation of granular, liquid or semi-liquid material from a container to a place where it is to be used and having a container with a sealable materials inlet therefor, an atmospheric vent with a pneumatic control valve therefor, an outlet hose for conveying the said material out of said container with a pneumatic outlet control valve therefor, a fluid pressure inlet with a pneumatic control valve therefor, and a source of pressure fluid, the combination which comprises a conduit in flow communication with said source of pressure fluid and said atmospheric vent valve and said pressure fluid inlet and said control valve therefor and said outlet hose and said control valve therefor, first control means in said conduit in flow communication with said atmospheric vent valve for the actuation therefor in response to a first predetermined fluid pressure in said conduit, second control means in said conduit and in flow communication with said outlet hose control valve for the actuation thereof in response to a second predetermined fluid pressure in said conduit, third control means in said conduit and in flow communication with said pressure fluid inlet control valve for the actuation thereof in response to a third predetermined fluid pressure in said conduit, a pressure reduction valve in said conduit between said source of pressure fluid and said first and second and third control means for selectively adjusting the fluid pressure from said source to all said control means for the actuation thereof selectively and sequentially as desired, and means in each of said control means for the selection and adjustment thereof individually of said predetermined pressures.

8. Apparatus as recited in claim 7 and including a pressure fluid operated pulsating device in said container with a control valve therefor, said control valve being in flow communication with said second control means and actuated thereby in response to said second predetermined pressure for agitating the said material in said container.

9. In apparatus of the character described for selectively supplying pressure fluid to a pulsation chamber and for venting pressure fluid from said chamber and having a source of pressure fluid and a conduit in flow communication with said source and said chamber for conveying pressure fluid from said source to said chamber, the combination which comprises a two-way shut-off valve in said conduit which in open position allows flow of pressure fluid from said source to said chamber and in closed position interrupts said flow and vents said chamber and that portion of the said conduit between the said valve and said chamber to the atmosphere, a secondary conduit leading from said shut-off valve to said portion of said conduit between said chamber and said shut-off valve, a spring-biased pressure reduction valve in said secondary conduit responsive to a predetermined pressure in said chamber and in said portion of said conduit adjacent said chamber for overcoming said spring bias and actuating said shut-off valve from an open position to a closed position for venting the said portion of said conduit and said chamber, said spring-bias in said pressure reduction valve overcoming pressure in the said portion of said conduit and in said chamber after venting thereof for actuating said shut-off valve to an open position, and adjustable throttle valve means in said secondary conduit for throttling the pressure fluid in said secondary conduit whereby the accumulation and venting of the said fluid pressure in said secondary conduit is controlled as desired and at a predetermined level for the actuation of said pressure reduction valve, and a fluid pressure storage vessel communicating with said secondary conduit for the accumulation of pressure fluid therein for accommodating pressure fluid fluctuations in said secondary conduit effecting smooth actuation of said pressure reduction valve and said shut-off valve from one said position to the other.

10. Apparatus as recited in claim 9 which also includes an admission valve in said conduit between said source of pressure fluid and said two-way shut-off valve, and means for operating said admission valve for the opening thereof at a predetermined pressure lower than the pressure in said container.

References Cited in the file of this patent
UNITED STATES PATENTS

| | | |
|---|---|---|
| 2,043,632 | Stover | June 9, 1936 |
| 2,731,032 | Hughes | Jan. 17, 1956 |
| 2,732,099 | Davis | Jan. 24, 1956 |
| 2,887,292 | Titchenal | May 19, 1959 |
| 2,916,441 | Kruse | Dec. 8, 1959 |